US012792083B2

(12) United States Patent
Wang et al.

(10) Patent No.: US 12,792,083 B2
(45) Date of Patent: Nov. 10, 2026

(54) SPI TO I2C INTERFACE SYNCHRONOUS CONVERTER

(71) Applicant: Rockwell Automation Asia Pacific Business Center. Pte. Ltd., Singapore (SG)

(72) Inventors: Shunli Wang, Singapore (SG); Qiuwen Cheng, Singapore (SG)

(73) Assignee: Rockwell Automation Asia Pacific Business Center. Ptd. Ltd., Singapore (SG)

( * ) Notice: Subject to any disclaimer, the term of this patent is extended or adjusted under 35 U.S.C. 154(b) by 237 days.

(21) Appl. No.: 18/603,311

(22) Filed: Mar. 13, 2024

(65) Prior Publication Data

US 2025/0291380 A1 Sep. 18, 2025

(51) Int. Cl.
*G06F 1/12* (2006.01)
*G06F 13/42* (2006.01)

(52) U.S. Cl.
CPC ............ *G06F 1/12* (2013.01); *G06F 13/4282* (2013.01); *G06F 2213/0002* (2013.01); *G06F 2213/0016* (2013.01)

(58) Field of Classification Search
CPC ............... G06F 1/12; G06F 2213/0016; G06F 2213/0002; G06F 13/4282
See application file for complete search history.

(56) References Cited

U.S. PATENT DOCUMENTS

| | | | | |
|---|---|---|---|---|
| 11,144,491 B1* | 10/2021 | Huang | G06F 13/4004 | |
| 2011/0161545 A1* | 6/2011 | Chang | G06F 13/4068 | 710/305 |
| 2013/0297829 A1* | 11/2013 | Berenbaum | G06F 13/4256 | 710/36 |
| 2016/0378153 A1* | 12/2016 | Kelly | G06F 13/4022 | 713/300 |
| 2024/0078209 A1* | 3/2024 | Wang | G06F 9/30101 | |
| 2024/0427726 A1* | 12/2024 | Beaudoin | G06F 13/4291 | |

OTHER PUBLICATIONS

Actel Corporation, "SPI-to-I2C Interface Design Example," Application Note AC324, Apr. 2009, (13 pages).

(Continued)

*Primary Examiner* — Nimesh G Patel
(74) *Attorney, Agent, or Firm* — Boyle Fredrickson, S.C.

(57) ABSTRACT

A logic circuit for converting serial data includes three SPI protocol inputs, including a chip select signal, an input clock signal, and an input data signal. The logic circuit also includes two I2C protocol outputs, including an output clock signal and an output data signal. The logic circuit detects the chip select signal transitioning to a logical zero state and initializes the output clock signal and the output data signal for data transmission. The input clock signal is mirrored to the output clock signal as the input clock signal is received at the second input, and the input data signal is transferred to the output data signal as the input data signal is received at the third input. The chip select signal is detected transitioning to a logical one state, and the output clock signal and the output data signal are reset indicating data transmission is complete.

20 Claims, 3 Drawing Sheets

(56) References Cited

OTHER PUBLICATIONS

Dung, Nguyen Hoang, "Designing SPI to 12C Protocol Converter Base on ASIC Technology and Implementing on the FPGA Platform." JST: Smart Systems and Devices, Sep. 2021 (8 pages).
NXP Semiconductors, "SPI to I2C-Bus Bridge," SC18IS604, Product data sheet, Sep. 22, 2021 (29 pages).
RENESAS Electronics Corporation, "Application Note Bidirectional I2C to SPI Bridge," AN-CM-334, Apr. 4, 2022 (11 pages).
Silicon Labs, "SPI to 12C Bridge and GPIO Port Expander," CP2120, Silicon Laboratories, Rev. 1.0, 2015 (24 pages).

* cited by examiner

SPI TO I2C INTERFACE SYNCHRONOUS CONVERTER

BACKGROUND INFORMATION

The subject matter disclosed herein relates to a system for synchronously converting serial data from a Serial Peripheral Interface (SPI) protocol to an Inter-Integrated Circuit (I2C) protocol. More specifically, a logic circuit is provided at the output of the SPI protocol to synchronously convert the clock and data between the SPI protocol and the I2C protocol.

As is known to those skilled in the art, many serial protocols exist, and it is not practical for a single device to be configured to communicate via each protocol. Devices include pins to communicate via a preferred serial protocol but may be included in a system with other devices configured to communicate via a different serial protocol. Further, the two devices located within the same system and each configured to communicate via a different serial protocol may need to communicate with each other.

Historically, it has been known to provide a gateway, or bridge, to convert data from one serial protocol to another serial protocol. The gateway will cause data to be buffered at least once and sometimes twice during the protocol conversion process. An incoming data packet from a first device in a first serial protocol is first stored in an input buffer until all of the data in the data packet has been received. The gateway device may perform processing on the data and move the data to an output buffer for retransmission. In some instances, no additional processing of the data is required and the input buffer may serve as a shared input/output buffer. The data in the output buffer data is retransmitted from the gateway in a second serial protocol to a second device. However, buffering of data for retransmission introduces delays in the serial communication.

Thus, it would be desirable to provide an improved system for converting data between a first serial protocol and a second serial protocol.

It is another aspect of this invention to provide an improved system for converting data between the SPI protocol and the I2C protocol.

BRIEF DESCRIPTION

According to one embodiment of the invention, a system for converting serial data includes a first input connected to a chip select signal, a second input connected to an input clock signal, a third input connected to an input data signal, a first output to provide an output clock signal, a second output to provide an output data signal, and a logic circuit. The logic circuit is operative to sequentially perform the following steps. The chip select signal is detected transitioning to a logical zero state, and the output clock signal and the output data signal are initialized. The input clock signal is mirrored to the output clock signal as the input clock signal is received at the second input, and the input data signal is transferred to the output data signal as the input data signal is received at the third input. The chip select signal is detected transitioning to a logical one state, and the output clock signal and the output data signal are reset.

According to another embodiment of the invention, a system for converting serial data includes a delay element receiving a chip select signal and generating a delayed chip select signal. A logical OR gate receives the chip select signal, the delayed chip select signal, and an input clock signal and generates an output clock signal. A truth table receives the chip select signal, the delayed chip select signal, and an input data signal and generates an output data signal. A tri-state device receives the output data signal as an enable signal.

According to yet another embodiment of the invention, a method for converting serial data includes detecting a chip select signal transitioning to a logical zero state. Responsive to detecting the chip select signal transitioning to the logical zero state, an output data signal at the logical zero state is generated and an output clock signal at the logical zero state is generated after generating the output data signal. An input data signal and an input clock signal are received. The input clock signal is transmitted to the output clock signal, and one bit of the input data signal is transmitted to the output data signal with each cycle of the input clock signal. Responsive to completing transmission of the input data signal the clock output signal is set to a logical one state and the data output signal is set to the logical one state.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
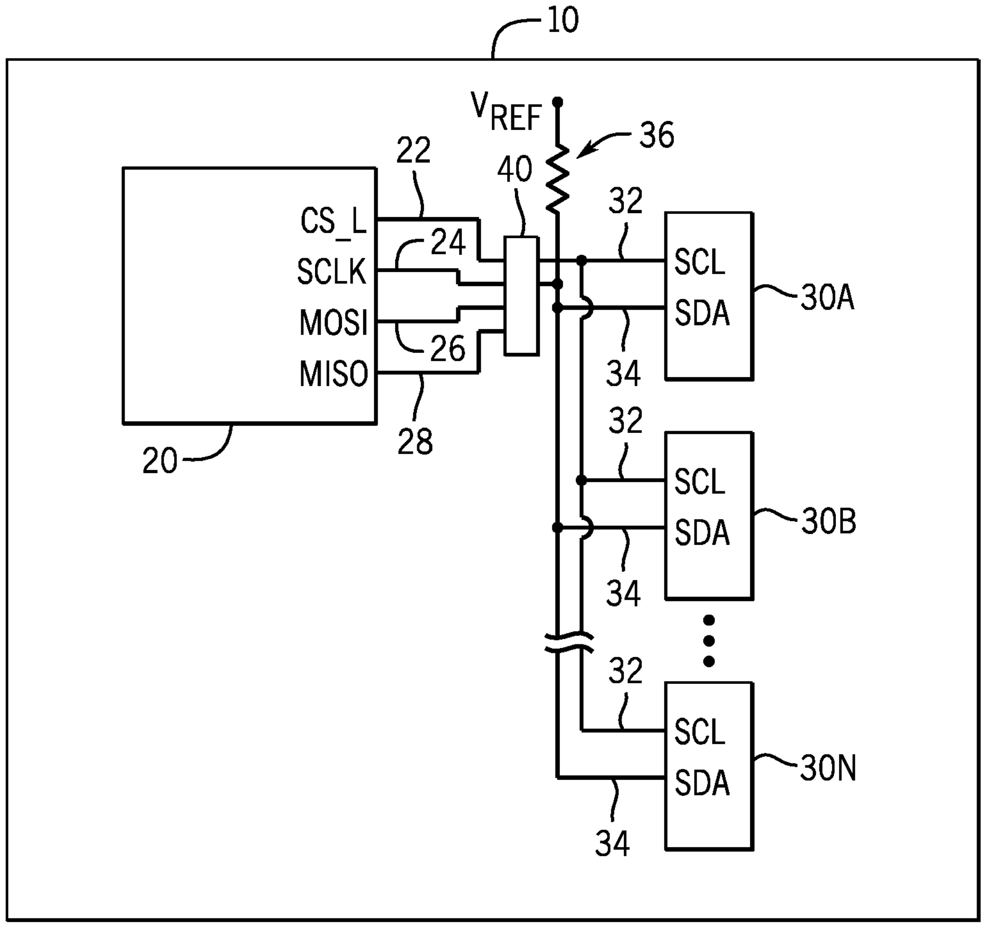
FIG. 1 is a schematic representation of an exemplary control circuit incorporating a synchronous converter according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system for converting data between a first serial protocol and a second serial protocol. According to one aspect of the invention, the system converts data between the SPI protocol and the I2C protocol. The present invention provides a custom integrated circuit in series with a first device using the SPI interface and a second device using the I2C protocol. The custom integrated circuit has logic to receive data packets in the SPI protocol. The logic will sequence the Serial Clock (SCL) and Serial Data (SDA) lines correctly for the I2C protocol to begin and end transmission. During transmission, the logic mirrors the input clock signal, SCLK, from the SPI protocol to the output clock signal, SCL, for the I2C protocol, and the logic mirrors data from the Master Output/Slave Input (MOSI) line of the SPI protocol to the SDA line of the I2C protocol. The logic is further able to receive data packets from the I2C protocol and mirror those data packets to the Master Input/Slave Output (MISO) line of the SPI protocol. As a result, the custom integrated circuit allows for data transmitted between a first device, operating in the SPI Master role, and a second device, operating in the I2C slave role, to be transmitted and received synchronously and in real-time between the devices.

As used herein, a logical zero state is considered a low voltage state, and a logical one state is considered a high voltage state. In a low voltage state, the voltage at the pin will be near zero volts and is typically less than four-tenths of a volt, 0.4 VDC. In a high voltage state, the voltage at the pin will be near a reference voltage, where the reference voltage may be three and three-tenths volts, 3.3 VDC, five volts, 5 VDC, or any other suitable reference voltage. Many logic circuits consider a logical one state to be a voltage greater than two volts, 2 VDC. The logical zero state may also be considered to be a Boolean value of False, and the logical one state may be considered to be a Boolean value of True.

Turning initially to FIG. 1, an exemplary control circuit 10 including a synchronous converter 40 is illustrated. The illustrated control circuit 10 is included on a single substrate. A first electronic device 20 is configured as a master device with respect to the serial communications. One or more additional devices 30 are configured as slave devices with respect to the serial communications, where the illustrated embodiment includes N slave devices. According to one aspect of the invention, the first electronic device 20 is a processor configured to transmit and receive data via serial communications. The processor 20 includes a serial port configured to communicate via the SPI protocol. As is understood, communication in the SPI protocol occurs over four lines. The master device 20 executing the SPI protocol includes a chip select pin, CS_L, where the chip select pin is drawn to a logical zero state to activate a slave device for communication. When the master device is transmitting data, a clock signal is output on the SCLK pin and data to be transmitted is output, one bit at a time, on the MOSI pin. At the same time, the master device receives data one bit at a time on the Master Input/Slave Output (MISO) pin. When communications are complete, the CS_L pin is drawn to a logical one state to deactivate the slave device.

Each of the additional devices 30 are configured to communicate via the I2C protocol. As is understood, communication in the I2C protocol occurs over two lines. A master device starts I2C protocol communication by implementing a start sequence. The start sequence first drives the SDA line to a logical zero state while keeping the SCL line at the logical one state. To initiate a data transaction, the master device then drives the SCL line to a logical zero state. The master device can then either drive the SDA line to transmit data or permit the slave device to drive the SDA line to receive data, where data is transmitted one bit per clock cycle. Because the master device 20 in the illustrated example is communicating via the SPI protocol, a converter 40 is provided to translate the data from the SPI protocol to the I2C protocol.

As used herein, a reference numeral with a letter following the reference numeral is intended to refer to a particular instance of the object identified by the reference numeral. A reference numeral used without a letter following the reference numeral is intended to refer to the object generally. For example, an additional device 30 referred to above, will reference additional electronic devices configured as slave devices with respect to the serial communications generally. As illustrated, a first additional device 30A is distinguished from a second additional device 30B by the addition of a letter following the reference numeral.

A synchronous converter 40 is provided between the master device 20 communicating via the SPI protocol and the additional devices 30 communicating via the I2C protocol. According to one aspect of the invention, the synchronous converter 40 may be implemented using multiple discrete logic integrated circuit (IC) devices. Each IC device may implement one or more features of the synchronous converter 40 such as providing a logic AND gate, a logic OR gate, a logic Exclusive-OR gate, or the like. According to another aspect of the invention, the synchronous converter is implemented on a programmable logic device (PLD). The PLD may be selected from a programmable logic array (PLA), a field-programmable gate array (FPGA), an application specific integrated circuit (ASIC), or the like. According to still another aspect of the invention, a portion of the synchronous converter 40 may be implemented on discrete logic IC devices and another portion of the synchronous converter may be implemented on the PLD.

Figure 2:
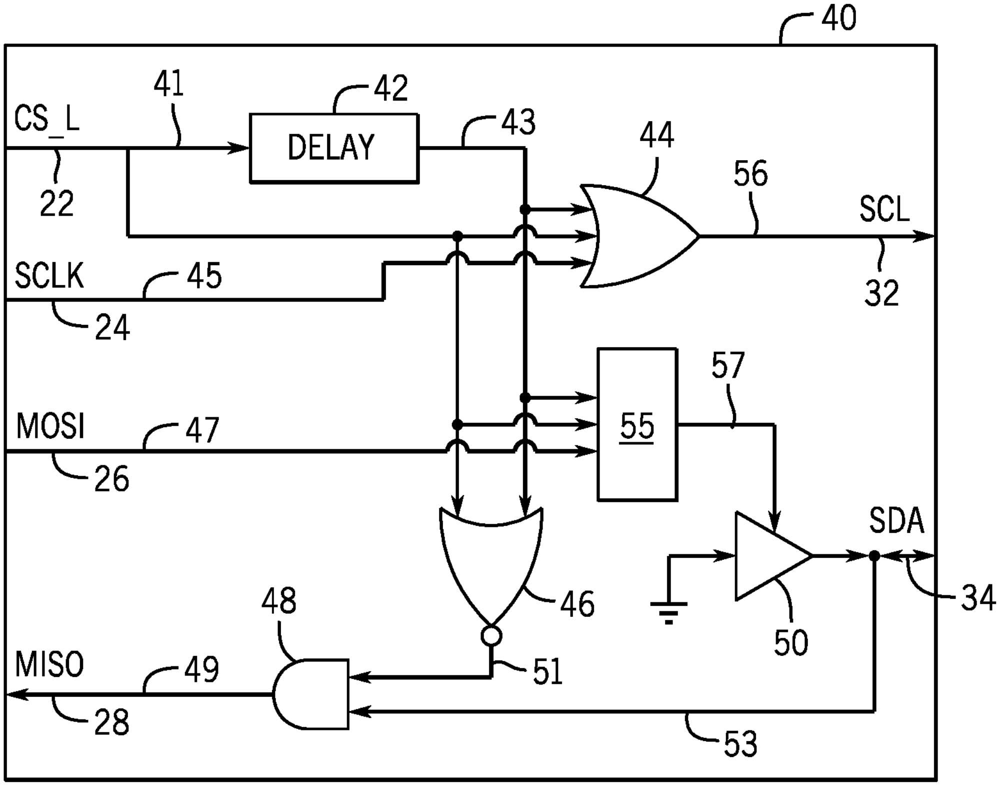
FIG. 2 is a logical block diagram representation of the synchronous converter of FIG. 1.

With reference also to FIG. 2, the synchronous converter 40 includes four pins for the SPI protocol and two pins for the I2C protocol. A first pin 22 is an input pin from the SPI protocol and receives the chip select signal 41. A second pin 24 is an input pin from the SPI protocol and receives the SPI clock signal 45. A third pin 26 is an input pin from the SPI protocol and receives the output data 47 from the master device 20, where the output data from the master device 20 is input data to the slave device 30. A fourth pin 28 is an output pin to the SPI protocol and is used to provide input data to the master device 20, where output data from the slave device 30 is the input data 49 to the master device. A first I2C pin 32 is an output pin for the I2C protocol and provides the I2C clock signal as an output clock signal 56. A second I2C pin 34 is a bidirectional pin 34 and either transmits an output data signal 57 from the MOSI pin to the slave device or transmits an input data signal 53 from the slave device to the MISO pin.

The synchronous converter 40 also includes several logic elements connected between the input and output pins. A logical delay 42 is introduced on the chip select signal 41. The logical delay 42 may be realized, for example, by a number of delay flip-flops, or other logic gates through which the chip select signal 41 passes. The logical delay 42 receives the SPI protocol chip select signal 41 from the CS_L input pin 22 and outputs a delayed chip select signal 43. A logical OR gate 44 is provided which receives the chip select signal 41, the delayed chip select signal 43, and the SPI protocol clock signal 45 from the SCLK input pin 24 as inputs and outputs an I2C clock signal 56 for the I2C SCL output pin 32. A logic element with a truth table 55 is provided which receives the chip select signal 41, the delayed chip select signal 43, and the input data signal 47 from the MOSI input pin 26 as input signals. The truth table 55 may be further implemented by additional discrete logical devices. Preferably, the truth table 55 is implemented by a Look-Up Table (LUT) on the PLD and provides an output data signal 57 as a function of the input signals and the logic defined within the truth table 55. The output data signal 57 is connected to a tri-state device 50. As will be discussed in more detail below, the tri-state device 50 will selectively provide the output data signal 57 to the SDA pin 34 and will selectively allow an input data signal 53 from a slave device be received at the SDA pin 34. A logical NOR gate 46 receives the chip select signal 41 and the delayed chip select signal 43 as inputs and outputs an intermediate logical signal 51. A logical AND gate 48 receives the intermediate logical signal 51 and the input data signal 53 as inputs and provides a slave data output signal 49 to the MISO pin 28 on the synchronous converter 40.

Figure 4:
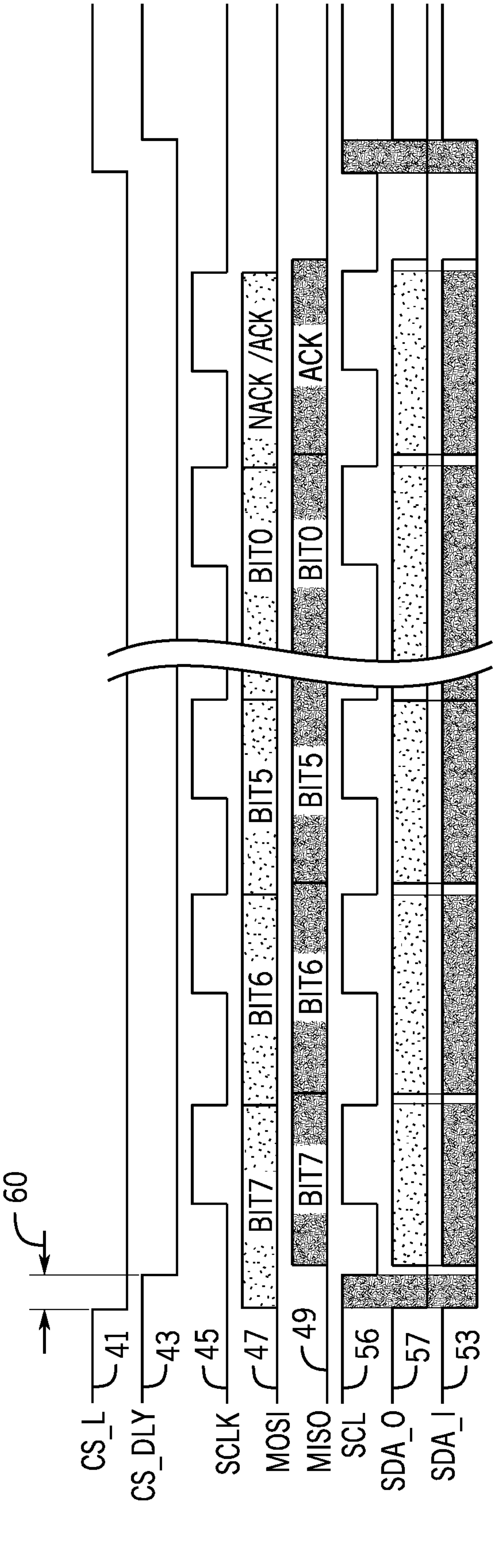
FIG. 4 is a timing diagram illustrated a conversion of a data transmission between SPI and I2C protocols.

In operation, the synchronous converter 40 will convert data between the SPI protocol and the I2C protocol. FIG. 4 provides a timing diagram illustrating an exemplary conversion of a data packet between SPI and I2C protocols. Synchronous conversion of the data packet indicates that the input clock signal 45 is provided synchronously to the output clock signal 56 such that the data being transmitted from the SPI protocol is converted in real-time to data for the I2C protocol.

As an initial step for protocol conversion, the start sequence for an SPI data packet must be converted to a start sequence for an I2C data packet. For the SPI protocol, a master device initiates communication by pulling the chip select line, CS_L, low. For the I2C protocol, the SDA line must be pulled to the logical zero state prior to pulling the SCL line to the logical zero state to initiate communications. In FIG. 2, the chip select line from the master device 20 is provided to one of the input pins 22 on the synchronous converter 40. The chip select signal 41 is then provided as an input to the logical delay 42. With reference also to FIG. 4, the duration 60 of the logical delay 42 is set equal to or greater than a minimum time required between pulling the SDA line to the logical zero state and then pulling the SCL line to the logical zero state as required for the start sequence of an I2C data packet. For a standard I2C speed, the minimum time is four microseconds (4 μs). For a fast I2C speed, the minimum time is six-tenths of a microsecond (0.6 μs). For a fast-plus I2C speed, the minimum time is twenty-six hundredths of a microsecond (0.26 μs).

The chip select signal 41 and the delayed chip select signal 43 are used to generate the desired sequence of SDA and SCL at the output of the synchronous converter 40 for the I2C start sequence. First, the SDA pin 34 must be pulled low while keeping the SCL output pin 32 high. The SDA pin 34 is controlled by the tri-state device 50, which is connected in a reverse state. The tri-state device 50 has an enable pin, connected to the output data signal 57, and a data pin, which is tied to a ground connection. When the output data signal 57 is at a logical zero state, the tri-state device 50 is disabled, and the SDA pin 34 would be floating. To avoid having the SDA pin floating, the pin is pulled to a logical high state by an external pull-up resistor 36. The pull-up resistor 36 puts the SDA pin 34 in a logical high state when the pin is not being controlled by either the master device 20 or one of the slave devices 30. When the tri-state device is disabled, the SDA pin 34 is able to receive input data from one of the slave device 30, which is, in turn, provided back the MISO pin 28 for transmission to the master device 20. If the tri-state device 50 is disabled and no data is being received from a slave device 30, the SDA pin will be tied to a logical one state. When the output data signal 57 is at a logical one state, the tri-state device 50 is enabled and the output of the tri-state device corresponds to the logical zero, or ground state, at which the input is tied. In order to transmit data from the master device 20 to the slave devices 30, the output data signal 57 is selectively set to a logical zero state or a logical one state, which is inverse of the desired output data. In the logical zero state, the tri-state device 50 is disable, and the SDA pin 34 is tied to the logical one state by the pull-up resistor 36, and in the logical one state, the tri-state device 50 is enabled, providing a logical zero state to the SDA pin 34.

Figure 3:
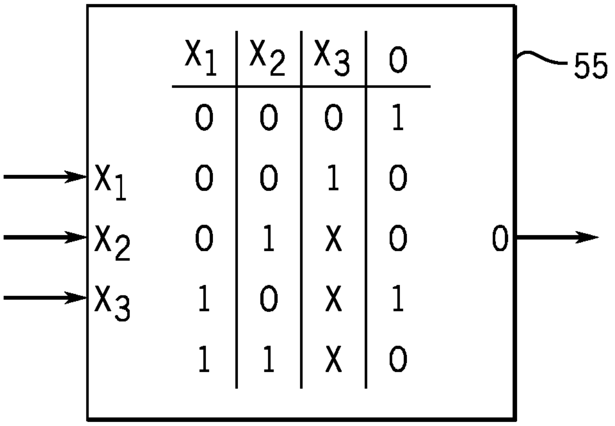
FIG. 3 is a truth table utilized by the synchronous converter of FIG. 2.

During the start sequence, either the chip select signal 41 or the delayed chip select signal 43 will be at a logical one state. As indicated by the truth table 55 in FIG. 3, the state of the input data signal 47 is ignored during the start sequence and the states of the chip select signal 41 and the delayed chip select signal 43 are used to drive the output of the truth table. Initially, both the chip select signal 41 and the delayed chip select signal 43 are in a logical one state, as this is the idle state between communications. As noted in the last line of the truth table 55, when both the chip select signal 41 and the delayed chip select signal 43 are in a logical one state the output data signal 57 is set to zero and the tri-state device 50 is set to the high-impedance state. When the chip select signal 41 is brought low, the delayed chip select signal will remain high for the duration 60 of the logical delay 42. As noted in the third line of the truth table 55, a logical zero chip select signal 41 and a logical one delayed chip select signal 43 result in the output data signal 57 being set to one. Setting the output data signal 57 to one enables the tri-state device 50 and draws the SDA pin 34 to a logical zero state.

After bringing the SDA pin 34 to a logical zero state, the synchronous converter 40 must then set the SCL output pin 32 to a logical zero state. This is done via the logical OR gate 44 connected in series before the SCL output pin. The SPI clock signal 45 has not started and is at a logical zero state. While either the chip select signal 41 or the delayed chip select signal 43 are in a logical one state, the I2C clock signal 56 remains in a logical one state. After the chip select signal 41 transitions to the logical zero state and the logical delay 42 has run, the delayed chip select signal 43 transitions to a logical zero state and all of the inputs to the logical OR gate 44 are at the logical zero state. As a result, the I2C clock signal 56 is brought to the logical zero state. Thus, the output data signal 57 from the truth table 55 is first brought to the logical zero state when the chip select signal 41 becomes a logical zero, and the I2C clock signal 56 is brought to the logical zero state after the duration 60 of the logical delay 42, completing the start sequence for the I2C protocol based on the start sequence of the SPI protocol.

After signaling the start of a new data packet, the synchronous converter 40 converts the data packet from the SPI protocol to the I2C protocol as it is being transmitted. As is known for I2C protocol, each slave device 30 has a dedicated device address. The master device 20 must send an initial command byte of data to select one of the slave devices 30 for read or write access after the start sequence is complete. The command byte includes seven bits for the device address and one bit to indicate whether the communication is for read or write access (R/W). After the command byte has been transmitted, the master device 20 will either write data to the selected slave device 30 or read data from the selected slave device 30. During a master write cycle, the MOSI pin 26 receives the data from the master device 20 to be transmitted to the slave device 30. When the master device 20 is transmitting data, data is received at the synchronous converter 40 at the MOSI input pin 26. As illustrated in the first two lines of the truth table 55 in FIG.

3, when the chip select signal 41 and the delayed chip select signal 43 are in the logical zero state the output data signal 57 will be driven in a reverse state from the input data signal 47 received on the MOSI pin 26. The input data signal 47 is received at the truth table 55 and the output data signal 57 is in an inverted state from the input data signal. This inversion controls the tri-state device 50 such that the output of the tri-state device 50 matches the input data signal 47. When the input data signal 47 is in a logical zero state, the output data signal 57 is in the logical one state. When the output data signal is a logical one, the tri-state device 50 is enabled, conducting the signal at the input to the output of the device. The input of the tri-state device 50 is tied to ground such that the output of the tri-state device is also at a ground reference value or, in other words, is at the logical zero state. Therefore, when the input data signal 47 is in a logical zero state, the SDA pin 34 will also be in the logical zero state. When the input data signal 47 is in a logical one state, the output data signal 57 is in the logical zero state. When the output data signal is a logical zero and the master device 20 is writing data, the tri-state device 50 is disabled and the pull-up resistor 36 brings the SDA pin 34 to a logical one state. Therefore, when the input data signal 47 is in a logical one state, the SDA pin 34 will also be in the logical one state.

It is also noted that the SDA pin 34 is provided as an input to the logical AND gate 48 within the synchronous converter 40. With the chip select signal 41 and the delayed chip select signal 43 both in the logical zero state during a master write cycle, the intermediate logical signal 51 output from the NOR gate 46 will be a logical one state, allowing the data on the SDA pin 34 to be provided as a loop back data signal 53. The data signal 53 will pass through the logical AND gate 48 to the MISO pin 28 on the synchronous converter 40 and, in turn, back the master device 20.

During a master read cycle, the MOSI signal 47 is set to a logical one state such that the output data signal 57 is in the logical zero state. In the logical zero state, the output data signal 57 disables the tri-state device 50 and the SDA pin is pulled up by the pull-up resistor 36. However, when a slave device 30 is providing data to the master device 20 via the SDA pin, the slave device 30 is able to control the state of the SDA pin 34, thereby selectively providing a logical one or logical zero on the SDA pin 34 according to the data being written one bit at a time.

During the read or write cycles, both the chip select signal 41 and the delayed chip select signal 43 remain at the logical zero state throughout the duration of the data transmission. As a result these two inputs to the logical OR gate are zero, and the logical OR gate 44 passes the input clock signal 45 from the SCLK pin 24 to the output clock signal 56 for the SCL pin 32. The serial clock from the SPI protocol is synchronously passed to the serial clock for the I2C protocol.

During serial communications between the master device 20 and the additional devices 30, the master device 20 may be expecting data from one of the additional devices 30 at the SDA pin 34. This may be in the form of either an Acknowledge or a data word from one of the additional devices. With the chip select signal 41 and the delayed chip select signal 43 in the logical zero state, the MOSI pin 26 and, therefore, the input data signal 47 are set to a logical one state to enable reading data. This combination of inputs corresponds to the second line of the truth table 55, which outputs a logical zero state on the output data signal 57. As previously discussed, setting the output data signal 57 to low will disable the tri-state device 50 and the SDA pin 34 is pulled to a logical high state via the pull-up resistor 36. The additional device 30 may then control the state of the SDA pin 34 and transmit data to the SDA pin, driving the SDA pin 34 between the logical zero and logical one states. This data received at the SDA pin 34 becomes an input data signal 53 from the SDA pin 34. The data is provided to the logical AND gate 48 within the synchronous converter 40. With the chip select signal 41 and the delayed chip select signal 43 both in the logical zero state, the intermediate logical signal 51 output from the NOR gate 46 will be a logical one state, allowing the data on the input data signal 53 to pass through the logical AND gate 48 to the MISO pin 28 on the synchronous converter 40.

The master device 20 ends the data transmission by executing a stop sequence for the I2C protocol. For the I2C stop sequence, the SCL pin 32 must first be set to a high state, while the SDA pin 34 is a low state. After a short delay, the SDA pin is then set to the high state. The master device 20, being configured for the SPI communication protocol, will pull the CS_L pin 22 high which stops SPI communications. The chip select signal 41 is provided to the logical OR gate 44, and with the chip select signal 41 being a logical one, the output of the OR gate 44 becomes a logical one. The I2C clock signal 56 output from the OR gate 44 is provided to the SCL pin 32 pulling it high. Due to delay element 42, the delayed chip select signal 43 will remain low for a delay duration 60. From line four of the truth table 55 in FIG. 3, a chip select signal 41 in a logical 1 state and a delayed chip select signal 43 in a logical zero state result in the output data signal 57 being set to one. This enables the tri-state device 50 and draws the SDA pin 34 to a logical zero state. After the delay duration 60, both the chip select signal 41 and the delayed chip select signal 43 are at the logical one state. From line five of the truth table 55, the output data signal 57 is changed to logical zero state. The tri-state device 50 is disabled and the pull-up resistor 36 will cause the SDA pin 34 to be in the logical high state. The stop sequence is then complete and data transmission remains idle until the master device 20 again initiates a new start sequence.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for synchronous conversion of serial data, the system comprising:

a first input connected to a chip select signal;

a second input connected to an input clock signal, wherein the input clock signal alternately toggles between a logical zero state and a logical one state and wherein a duration of one logical zero state and one logical one state in sequence defines a period for the input clock signal;

a third input connected to an input data signal;

a first output to provide an output clock signal;

a second output to provide an output data signal; and a logic circuit operative to sequentially perform the following steps:

detect the chip select signal transitioning to a logical zero state, initialize the output clock signal and the output data signal responsive to detecting the chip select signal transitioning to the logical zero state, synchronously mirror the input clock signal to the output clock signal during the period the input clock signal is received at the second input, synchronously transfer the input data signal to the output data signal during the period of the input clock signal in which the input data signal is received at the third input, detect the chip select signal transition to a logical one state, and reset the output clock signal and the output data signal responsive to detecting the chip select signal transitioning to the logical one state.

2. The system of claim 1, wherein the logic circuit comprises a delay element connected in series with the chip select signal and wherein the delay element is operative to output a delayed chip select signal.

3. The system of claim 2, wherein the logic circuit further comprises a logical OR gate receiving the chip select signal, the delayed chip select signal, and the clock signal as inputs and an output of the logical OR gate is the output clock signal.

4. The system of claim 3, wherein the logic circuit further comprises a tri-state device receiving an output of a truth table as an input and an output of the tri-state device is the output data signal.

5. The system of claim 4, wherein the truth table receives the chip select signal, the delayed chip select signal, and the input data signal as inputs.

6. The system of claim 1, further comprising a fourth input, wherein the second output is bidirectional and the logic circuit is further operative to transmit data from the second output to the fourth input.

7. The system of claim 1, wherein:

the first input, the second input, and the third input are configured to receive signals from a Serial Peripheral Interface protocol, and the first output and the second output are configured to provide signals to an Inter-Integrated Circuit protocol.

8. The system of claim 1 further comprising a programmable logic device including the first input, the second input, the third input, the first output, the second output, and the logic circuit.

9. A system for converting serial data, the system comprising:

a delay element receiving a chip select signal and generating a delayed chip select signal;

a logical OR gate receiving the chip select signal, the delayed chip select signal, and an input clock signal and generating an output clock signal;

a truth table receiving the chip select signal, the delayed chip select signal, and an input data signal and generating an output data signal; and a tri-state device receiving the output data signal as an enable signal.

10. The system of claim 9, further comprising a bidirectional pin, wherein the bidirectional pin is selectively configured as an output pin or an input pin as a function of the enable signal.

11. The system of claim 9 further comprising a programmable logic device including the delay element, the logical OR gate, the truth table, and the tri-state device.

12. The system of claim 11, further comprising:

a master device configured to transmit data in a Serial Peripheral Interface protocol;

the programmable device receives the chip select signal, the input clock signal, and the input data signal from the master device, and an additional device configured to receive data in an Inter-Integrated Circuit protocol, wherein the additional device receives the output data signal and the output clock signal from the programmable device.

13. A method for synchronously converting serial data, comprising the steps of:

detecting a chip select signal transitioning to a logical zero state;

responsive to detecting the chip select signal transitioning to the logical zero state:

generating an output data signal at the logical zero state, and generating an output clock signal at the logical zero state after generating the output data signal;

receiving an input data signal and an input clock signal, wherein the input clock signal alternately toggles between a logical zero state and a logical one state and wherein a duration of one logical zero state and one logical one state in sequence defines a period for the input clock signal;

transmitting the input clock signal to the output clock signal during the period the input clock signal is received;

transmitting one bit of the input data signal to the output data signal with during the period of the input clock signal in which the input clock signal is received; and responsive to completing transmission of the input data signal:

setting the clock output signal to a logical one state, and setting the data output signal to the logical one state.

14. The method of claim 13, further comprising the steps of:

transmitting the chip select signal to a delay element connected in series with the chip select signal; and generating a delayed chip select signal as a function of the chip select signal and a duration of the delay element.

15. The method of claim 14 further comprising the steps of:

receiving the chip select signal, the delayed chip select signal, and the input clock signal at an input of a logical OR gate; and generating the output clock signal as an output of the logical OR gate.

16. The method of claim 14 further comprising the step of generating the output data signal as a function of the chip select signal, the delayed chip select signal, and the input data signal.

17. The method of claim 16 further comprising the step of selectively enabling a bidirectional data pin as a function of the output data signal.

18. The method of claim 17 further comprising the steps of:

enabling the bidirectional data pin for data input from another device; and transmitting the data input to a first device generating the chip select signal.

19. The method of claim 13, wherein:

the chip select signal, the input data signal, and the input clock signal are received from a master device communicating via a Serial Peripheral Interface protocol, and the output data signal and the output clock signal are transmitted to an additional device communicating via an Inter-Integrated Circuit protocol.

20. The method of claim 13 wherein the steps are performed on a programmable logic device.

* * * * *